Figure 1:
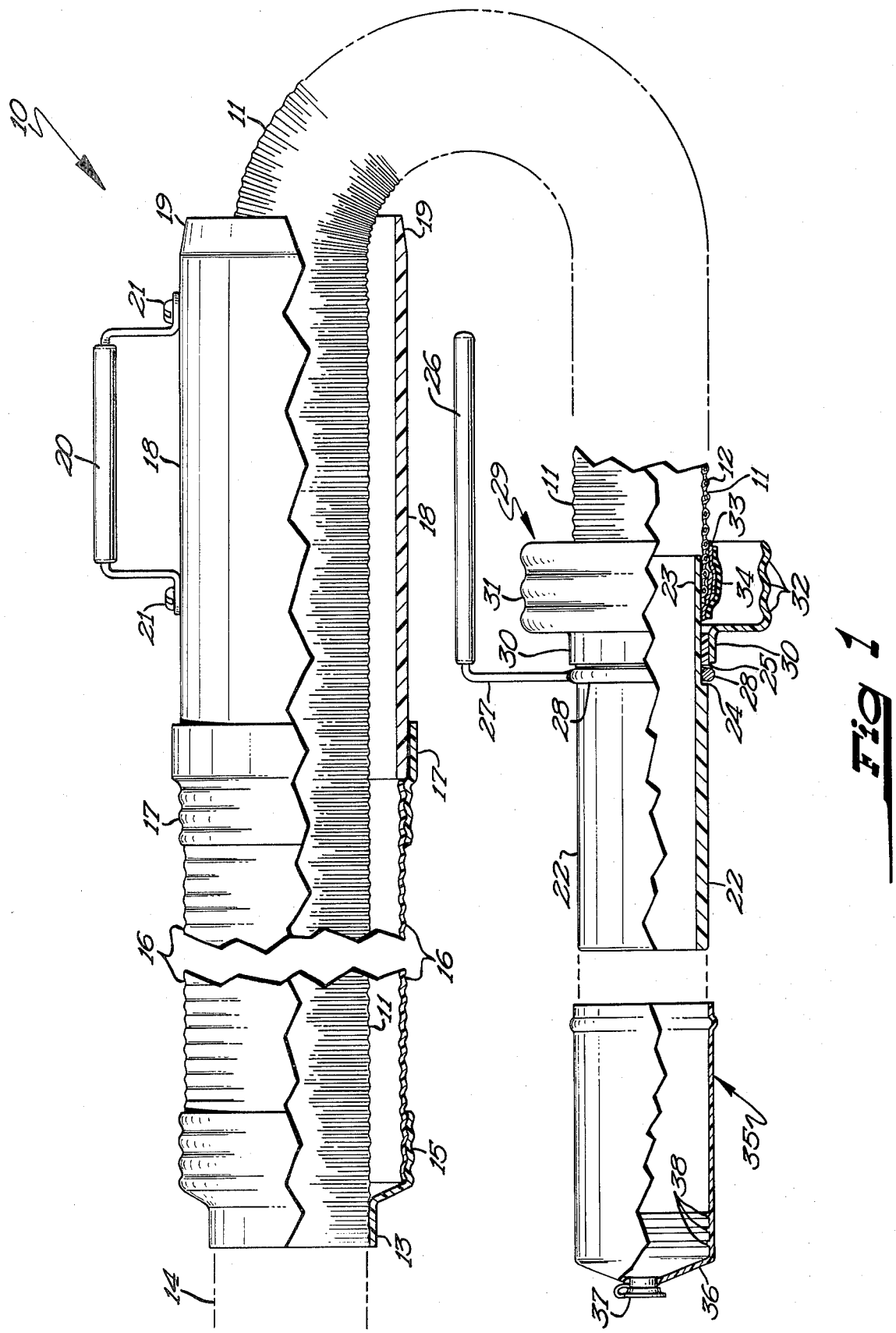

United States Patent [19]

Knutsen

[11] 4,231,595

[45] Nov. 4, 1980

[54] WASTE DISPENSING DEVICE FOR RECREATIONAL VEHICLES AND THE LIKE

[76] Inventor: Karl I. Knutsen, 9844 James Cir., Bloomington, Minn. 55431

[21] Appl. No.: 964,672

[22] Filed: Nov. 29, 1978

[51] Int. Cl.² .............................................. F16L 35/00
[52] U.S. Cl. .................... 285/38; 137/899.3; 137/355.16; 285/62; 285/299; 285/423; 285/DIG. 2; 285/DIG. 16
[58] Field of Search ................... 285/DIG. 2, 16, 62, 285/299, 423, 376, 302, 301, 300, 227, 381; 138/106; 137/344, 355.16; 144/382–388

[56] References Cited

U.S. PATENT DOCUMENTS

| | | | |
|---|---|---|---|
| 2,014,355 | 9/1935 | Hussman | 285/227 X |
| 3,712,331 | 1/1973 | Otto | 137/355.16 |
| 3,730,228 | 5/1973 | Gibbs | 285/302 X |
| 3,811,462 | 5/1974 | Feliz | 137/344 |
| 4,133,347 | 1/1979 | Mercer | 285/423 X |

FOREIGN PATENT DOCUMENTS 2154814  4/1973  France ........................... 285/299

*Primary Examiner*—Dave W. Arola
*Attorney, Agent, or Firm*—Williamson, Bains, Moore & Hansen

[57] ABSTRACT

A waste dispensing device for recreational vehicles includes an elongate longitudinally compressible and extensible hose which is connected to the waste outlet fitting of a recreational vehicle. The dispensing device includes an exterior housing structure which is secured to and positioned around that end portion of the hose which is connected to the recreational vehicle. The hose may be longitudinally retracted and contained within the exterior housing structure when the vehicle is being moved, and conversely, the hose may be longitudinally extended for connection to a waste disposal system, when the vehicle is stationary.

4 Claims, 1 Drawing Figure

WASTE DISPENSING DEVICE FOR RECREATIONAL VEHICLES AND THE LIKE

SUMMARY OF THE INVENTION

This invention relates to waste dispensing devices and more particularly to a waste dispensing hose and housing therefor for use with recreational vehicles.

An object of this invention is to provide a novel waste dispensing device including a flexible, extensible and retractable dispensing hose which may be readily extended for use in dispensing waste when the vehicle is parked, and which may be readily retracted to a stored position when the vehicle is being moved.

A more specific object of this invention is to provide a waste dispensing device, of simple and inexpensive construction, including a hose which is adapted to be connected to the conventional waste outlet fitting of a recreational vehicle, and an exterior housing for the hose in which the hose may be retracted to thereby protect the waste dispensing hose during travel of the recreational vehicle.

These and other objects and advantages of this invention will more fully appear from the following description made in connection with the accompanying drawings, wherein like reference characters refer to the same or similar parts throughout the several views.

FIGURES OF THE DRAWINGS

FIG. 1 is a side elevational view of the novel wast dispensing device with parts thereof broken away and being foreshortened for clarity.

PREFERRED EMBODIMENT OF THE INVENTION

Referring now to the drawing, it will be seen that one embodiment of my novel waste dispensing device, designated generally by the reference numeral 10, is thereshown. The waste dispensing device 10 is adapted for use with recreational vehicles and is intended to be connected to the waste outlet fitting of a recreational vehicle through which waste material is dispensed. Typically, the outer end of the waste dispensing device is adapted to dispense the waste material into a waste disposal system.

The waste dispensing device 10 includes an elongate, flexible inner tubular member or hose 11 which is formed of a liquid impervious material, preferably vinyl, and has a helical spring 12 embedded therein. It will be noted that the hose 11 has a bellows type construction and is longitudinally extensible and retractable as well as being flexible. One end of the inner hose 11 is connected to an annular coupling element 13 which is adapted to be connected to the waste outlet fitting 14 of a recreational vehicle. It will be noted that the coupling element 13 has an enlarged annular portion 15 to which is connected one end of an outer flexible tubular member or hose 16. The outer tubular member 16 although having a larger diameter than the inner hose 11, is of the same construction and is formed of a vinyl material having a helical spring embedded therein. Thus, this outer tubular member 16 is capable of flexure during use.

In this regard, it is pointed out that typically the inner hose 11 when in an extended position has a length dimension of ten or twenty feet. On the other hand, the outer tubular member 16 typically has a length dimension of approximately twelve inches. It is pointed out that the length of the inner tubular member is optional and may be as long as twenty feet in its extended position.

The rear or other end of the outer tubular member 16 is glued to a sleeve element 17, and the sleeve element sealingly secured, as by glueing, to one end of an elongate cylindrical sleeve 18. It will be noted that the rear or other end of the sleeve 18 is tapered as at 19. It is also pointed out that the sleeve 18 has a diameter larger than the diameter of the inner hose 11 and has a length dimension corresponding substantially to the length dimension of the outer tubular member 16. The sleeve 18 is provided with a U-shaped handle 20 having suitable securing elements, such as bolts 21, which secure the U-shaped handle to the sleeve adjacent the mid-portion thereof. The sleeve 18 and the outer tubular member 16 constitute an exterior housing in which the hose 11 is disposed when the latter is in the retracted position.

The hose 11 has an elongate, rigid cylindrical spout 22 secured to its other end and projecting therefrom. In the embodiment shown, the rigid spout has one end portion thereof relieved or reduced as at 23 which projects interiorly of the hose 11 and is glued thereto. The reduced end portion of the spout defines an annular shoulder 24, and an annular sleeve is positioned around the exterior portion of the hose 11 and is glued thereto but is spaced from the shoulder 24 so that a groove is defined between one end of the sleeve 25 and the shoulder 24. An L-shaped handle 26 having a leg 17 is provided with an annular attachment ring 28 which is positioned within the groove defned by the shoulder 24 and the sleeve 25. The annular attachment ring permits the L-shaped handle to rotate relative to the hose 11.

A clamping cap 29 includes an annular attachment portion 30 which is positioned around and is secured by glueing to the sleeve 25. The clamping cap 29 also includes a generally cylindrical enlarged clamping portion 31 which is provided with internal ridges 32 which are adapted for sealing engagement with the exterior surface of the rigid sleeve 18. In order to provide a fluid seal between the hose connection 11 and the spout 22, sealing tape 33 is applied to the exterior surface of the hose and a heavy rubber sealing band 34 is positioned around the tape 33. It will be noted that these sealing elements are positioned interiorly of the clamping cap 29.

The dispensing device 10 also includes an elongate sanitary self-sealing cap 35 which is of cylindrical configuration and which is formed of a rigid material. The sanitary cap 35 has an end portion 36 having an opening therein which is closed by conventional drain plug 37. The sanitary cap 35 is also provided with internal grooves 38 which form a fluid seal with the exterior surface of the spout 22.

In use, the coupling element 13 will be connected to the outlet fitting 14 of the recreational vehicle, and the hose 11 will be extended to its extended position when the recreational vehicle is parked, for example, at a campsite. The sanitary cap 35 will be removed from the spout 22 and the user will grip the handle 26 and pull the spout for insertion into a sewage disposal system. Liquid entrained waste material will be directed through the hose 11 into the conventional sewage disposal system at the campsite.

It is pointed out that the sleeve 18 may be supported or secured to a bracket carried by the vehicle or may be connected to any conventional adjacent structure on the recreational vehicle. When it is desirable to move the vehicle, a user merely removes the spout from its connected relation to the sewage disposal system and places the sanitary cap over the end of the spout. Thereafter, the hose may be compressed into the housing structure defined by the sleeve 18 and the outer tubular member 16 until the clamping cap engages the end of the sleeve 18. In this mode, the hose 11 will be compressed to substantially less than one-half of its overall length and will be conveniently stored within the housing structure for travel.

From the foregoing, it will be seen that I have provided a novel waste dispensing device which is not only of simple and inexpensive construction, but one which functions in a more efficient manner than any heretofore known comparable device.

What is claimed is:

1. A waste dispensing device for recreational vehicles and the like comprising:
    an elongate, flexible inner tubular member being longitudinally retractable and extensible between an extended position and a retracted position,
    a coupling element secured to one end of said tubular member and being adapted to be attached to the waste outlet fitting of a recreational vehicle,
    an elongate, rigid spout secured to the other end of said tubular member and projecting longitudinally therefrom,
    an elongate, exterior housing structure positioned around said inner tubular member and including an elongate rigid cylindrical sleeve and an elongate flexible outer tubular member, said outer tubular member having one end thereof connected to said coupling element and having the other end thereof connected to said rigid sleeve, said exterior housing structure having a length dimension substantially less than one-half the length dimension of the inner tubular member when the latter is in the extended position,
    an annular clamping cap positioned around and connected with said spout, the clamping cap releasably engaging an end portion of said rigid sleeve to retain the inner tubular member in a retracted position within said exterior housing structure.

2. The dispensing device as defined in claim 1 wherein said clamping cap is spaced inwardly from the outer end of said rigid spout.

3. The dispensing device as defined in claim 1 and a handle revolvably mounted on said dispensing device adjacent said spout.

4. The dispensing device as defined in claim 1 wherein said clamping cap extends radially outwardly at said spout adjacent the inner end thereof.

* * * * *